UNITED STATES PATENT OFFICE.

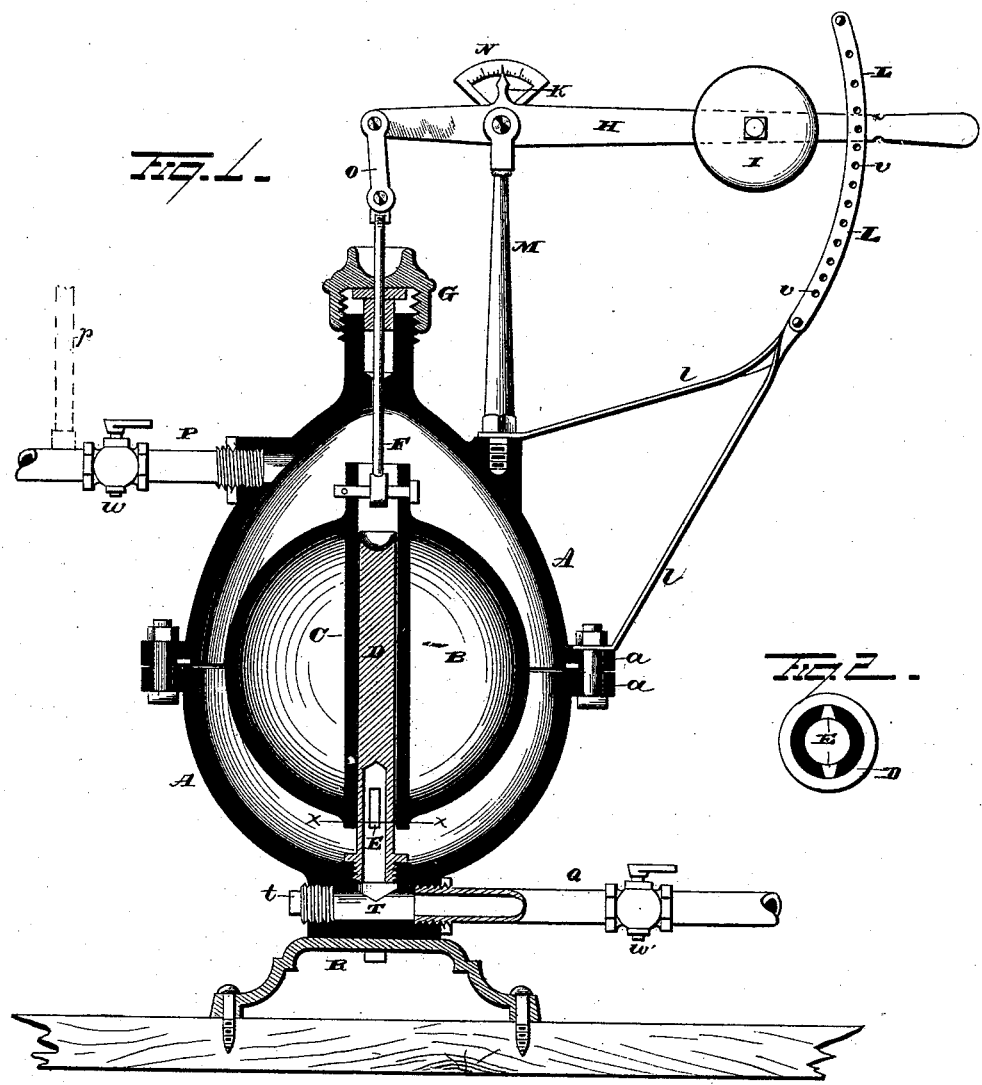

HANS CHRISTIAN FREDERICK CRAMER, OF CINCINNATI, OHIO.

DEVICE FOR REGULATING THE FLOW OF LIQUIDS IN ICE-MACHINES.

SPECIFICATION forming part of Letters Patent No. 343,437, dated June 8, 1886.

Application filed October 31, 1885. Serial No. 181,537. (No model.)

*To all whom it may concern:*

Be it known that I, HANS CHRISTIAN FREDERICK CRAMER, of Cincinnati, in the county of Hamilton and State of Ohio, have invented certain new and useful Improvements in Devices for Regulating the Flow of Liquids in Ice-Machines; and I do hereby declare the following to be a full, clear, and exact description of the invention, such as will enable others skilled in the art to which it appertains to make and use the same.

My invention relates to a device for regulating the flow of liquids through pipes, either accompanied or not by gas, steam, or air, its object being to provide a liquid-flow regulator which will operate automatically to open or close a passage to a given point in proportion to the volume of liquid, and to the exclusion of gas, air, or steam, or which may be set by hand to permit a determinate volume only of liquid to pass, or the full volume of liquid accompanied by a desired quantity of gas, steam, or air, as the case may be.

It is a further object to so construct such a regulator that it will operate equally well under all pressures of the liquid it is used to regulate within any range of pressure consistent with safety and utility; and it is also an object of my improvement to obviate the use of unreliable and fragile glass gage-tubes in connection with liquid-flow regulators, and to provide the same with positively-acting mechanical indicators not liable to break or get out of order.

My improved regulator is especially designed for use in chemical ice-making machines to regulate the flow of volatile liquid from the condenser to the refrigerator, and to separate gas from such liquid, though it may be used for other purposes—as, for instance, to regulate the flow of water and to separate air or steam therefrom, or to separate condensed water from steam; and in the accomplishment of its objects the invention consists in certain novel constructions and combinations of devices which will hereinafter be particularly described with reference to the accompanying drawings, Figure 1 of which represents a vertical central section of the main portion of the apparatus with some of the parts shown in full lines, and Fig. 2 is a cross-section on line $x\ x$.

Referring to the drawings, the letter A indicates an oval or egg-shaped metallic bulb or casing formed of two parts with flanges $a\ a$ bolted together. This bulb sits upright, its larger end being downward and having a tubular extension, T, the bore of which is at right angles to the vertical axis of the bulb. One end of this tubular extension is closed by a screw-plug, $t$, and with the other end is connected an outlet-pipe, Q. The bottom of the bulb A has an opening to the tubular portion, and into this opening is screwed a stem, D, which extends upward in the bulb A nearly to its top. The lower portion of the stem D is bored out, and its chambered portion communicates with the tube T, while through the wall of this chambered portion of the stem are cut slots, as at E, affording communication with the interior of bulb A. There are preferably two slots opposite to each other, though only one is visible in Fig. 1, and said slots widen inwardly, as shown in Fig. 2, so as to avoid being choked by anything which can enter from the bulb. The bulb stands upon a base, R, which may be screwed down to a floor, if desired.

The letter B indicates a spherical float, preferably formed of light cast-iron, and through its vertical center is arranged a tube, C, of similar metal, projecting somewhat above and below. This tube fits loosely upon the stem D, and its upper end is jointed to a rod, F, which passes through a stuffing-box, G, at the top of bulb, and is connected by a link, O, to the short arm of a lever, H, fulcrumed upon a post, M, rising from a lug at one side of bulb A. On the long arm of the lever is an adjustable counterpoise, I, and from a point immediately above its fulcrum projects a pointer or index, K, which plays before a graduated arc, N, fixed at the top of post M. A bracket, $l\ l$, attached to the bulb terminates outwardly in a curved bar, L, which extends upward alongside the outer portion of lever H, and has in it a series of holes, $v$, through either of which and a similar hole in the lever may be passed a pin, which will thus hold the lever at any desired point of adjustment.

The letter P indicates an inlet-pipe which connects with the upper portion of the bulb, and in dotted lines at $p$, I have shown a pipe which, in case of using the regulator with an ice-machine, is supposed to lead to the liquefier. Such a pipe is not necessary to the function of the apparatus as a liquid-flow regulator, but is useful in enabling the regulator to separate gas from the volatile liquid used in an ice-machine, or to separate air or steam from water, or condense water from steam. By means of the counterpoise I the float or globe B is so balanced that it exerts a downward pull equal to one-half the weight of the liquid which the globe displaces when it is submerged, or when the space between the globe and bulb A is nearly filled with the liquid the flow of which the apparatus is intended to regulate. The slots E E are of such capacity that when fully open they will allow the liquid to pass off faster than it can flow in through said pipe, or, in other words, the entire volume of liquid from the pipe will not fully occupy the slots, but leave a portion of the area of the same for the passage of gas, air, or vapor by which the liquid may be accompanied. When free to act automatically, the globe B rests at the bottom of the bulb A until said bulb is over half-filled by liquid entering through pipe P. It then begins to rise and opens the slots E sufficiently to allow the liquid to begin to flow out, and if the liquid continues to rise in the bulb the globe B will also rise until the slots E are opened sufficiently to allow the liquid to flow out as fast as it flows in. It will remain stationary until the supply of liquid begins to decrease, and will then begin to descend, so that no portion of the slot is left open beyond that sufficient to carry off the liquid as fast as it flows in, so that no gas can accompany the liquid as it flows from the bulb A. This is quite important in ice-machines, as it is well known that as the volatile liquid leaves the condenser it begins to evaporate, so that a proportion of gas accompanies the liquid in the conducting-pipe, and it is usually desirable that as little gas as possible shall accompany the liquid to the refrigerator which lies beyond the regulator, and is connected therewith by a pipe, such as pipe Q. The gas formed in the pipe P flows through pipe q to the liquefier, which is not shown in the drawings. The quantity of liquid flowing through the apparatus at any time may be readily ascertained by noticing the position of index K with relation to the scale N, this scale being graduated to show the amount of opening of the slot E. If, as is sometimes the case, it is desirable that a certain portion of gas shall pass through the regulator with the liquid, the long arm of the lever H may be depressed so as to open the slots E beyond the extent required to pass the volume of liquid flowing, as indicated by the pointer when the lever is left free. The surplus opening of the slots may be thus regulated by hand within the limit of the capacity of said slots.

While I have now described the operation of my improved regulator in connection with an ice-machine, and, as will be readily understood by persons familiar with such machines, it will readily be seen that the flow of water or any other liquid may be regulated and separated from vapor or air in the same manner as the volatile liquid of the ice-machine is regulated and separated from gas; also, steam might be passed through the pipe P and escape through the small pipe p, while the condense water flows through the regulator. The pipes P and Q are preferably provided with stop-cocks w and w', which will ordinarily be left open, and may be closed to prevent escape of gas or liquid when it is desired to take the regulator apart or remove it for cleansing or repair.

I do not confine myself to the precise shape and relative sizes of the parts of the apparatus as shown in the drawings, as they may obviously be changed without departing from the principle of the invention. The shapes given to the bulb or casing A and globe or valve B, as shown, are quite convenient; but it is only necessary that there shall be plenty of room inside the casing A for the valve B to ascend and descend freely.

Having fully described my invention, what I claim as new, and desire to secure by Letters Patent, is—

1. The combination, with the casing A, having connecting-pipes at top and bottom, of the tubular slotted stem arranged within said casing and connecting with the lower pipe, and the float surrounding said stem and arranged to rise and fall thereon for opening and closing the slot, substantially as described.

2. The combination, with the casing A, having connecting-pipes at top and bottom, of the stem D, with a tubular slotted lower portion standing vertically within said casing, and having its said tubular portion in connection with the bottom pipe, the valve B, having a central tube sliding on said stem, and the lever outside of the casing and connected with said valve by a rod passing through a stuffing-box, substantially as described.

3. The combination, with the casing A, having inlet and outlet pipes, the hollow valve suspended within said casing, and the counterweighted lever outside of said casing and connected with said valve, and the slotted stem surrounded by said valve, of the index projecting from said lever, and the fixed graduated scale arranged to be traversed by said index, substantially as described.

4. The combination, with the casing having inlet and outlet, slotted tubular inner stem connecting with the outlet-valve, with central tube sliding on said stem, and outer lever connected with said valve, of means for setting and fixing said lever in desired position, substantially as described, and for the purpose set forth.

In testimony whereof I have signed this specification in the presence of two subscribing witnesses.

HANS CHRISTIAN FREDERICK CRAMER.

Witnesses:
GEORGE WISSEL,
FRANK W. BURNHAM.